(12) United States Patent
Kim et al.

(10) Patent No.: US 10,845,998 B2
(45) Date of Patent: Nov. 24, 2020

(54) STORAGE DEVICE AND OPERATING METHOD THEREOF

(71) Applicant: SK hynix Inc., Gyeonggi-do (KR)

(72) Inventors: Jin Soo Kim, Gyeonggi-do (KR); Soong Sun Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/283,241

(22) Filed: Feb. 22, 2019

(65) Prior Publication Data

US 2020/0026441 A1 Jan. 23, 2020

(30) Foreign Application Priority Data

Jul. 23, 2018 (KR) .................. 10-2018-0085643

(51) Int. Cl.
*G06F 3/06* (2006.01)
*H04B 1/00* (2006.01)

(52) U.S. Cl.
CPC .......... *G06F 3/0622* (2013.01); *G06F 3/0637* (2013.01); *G06F 3/0673* (2013.01); *H04B 1/005* (2013.01)

(58) Field of Classification Search
CPC .... G06F 3/0622; G06F 3/0637; G06F 3/0673; H04B 1/005
See application file for complete search history.

(56) References Cited

U.S. PATENT DOCUMENTS

| | | | |
|---|---|---|---|
| 2002/0184385 A1* | 12/2002 | Kato | H04L 29/06 709/237 |
| 2003/0086585 A1* | 5/2003 | Rhoads | B42D 25/00 382/100 |
| 2008/0086576 A1* | 4/2008 | Schauer | G06F 3/0607 710/5 |
| 2013/0332620 A1* | 12/2013 | Gahm | H04N 21/23805 709/231 |

FOREIGN PATENT DOCUMENTS

| | | |
|---|---|---|
| KR | 100841982 | 6/2008 |
| KR | 1020090061031 | 6/2009 |

* cited by examiner

*Primary Examiner* — Henry Tsai
*Assistant Examiner* — John B Roche
(74) *Attorney, Agent, or Firm* — IP & T Group LLP

(57) ABSTRACT

There are provided a storage device having improved security and an operating method thereof. In a storage device including a memory controller for controlling a memory device including a plurality of memory blocks, the storage device includes: a host interface configured to receive an analog connection request signal provided by a host; and a host access controller configured to control access by the host according to host information acquired from the connection request signal.

17 Claims, 9 Drawing Sheets

FIG. 5

HOST INFORMATION_a

| AMPLITUDE(x) | AMPLITUDE INFORMATION |
|---|---|
| $X\_0 \leq x < X\_1$ | $X\_D1$ |
| $X\_1 \leq x < X\_2$ | $X\_D2$ |
| ⋮ | ⋮ |
| $X\_(n-1) \leq x < X\_n$ | $X\_Dn$ |

FIG. 6

HOST INFORMATION_b

| TOTAL LENGTH OF WAVEFORM(y) | TOTAL LENGTH INFORMATION |
|---|---|
| $Y\_0 \leq y < Y\_1$ | $Y\_D1$ |
| $Y\_1 \leq y < Y\_2$ | $Y\_D2$ |
| ⋮ | ⋮ |
| $Y\_(m-1) \leq y < Y\_m$ | $Y\_Dm$ |

HOST INFORMATION_c

| DISTANCE BETWEEN WAVEFORMS(z) | DISTANCE INFORMATION |
|---|---|
| $Z\_0 \leq z < Z\_1$ | $Z\_D1$ |
| $Z\_1 \leq z < Z\_2$ | $Z\_D2$ |
| ⋮ | ⋮ |
| $Z\_(k-1) < z < Z\_k$ | $Z\_Dk$ |

STORAGE DEVICE AND OPERATING METHOD THEREOF

CROSS-REFERENCE TO RELATED APPLICATION

The present application claims priority under 35 U.S.C. § 119(a) to Korean patent application number 10-2018-0085643, filed on Jul. 23, 2018, the entire disclosure of which is incorporated herein by reference in its entirety.

BACKGROUND

1. Field of Invention

Various embodiments of the present disclosure generally relate to an electronic device. Particularly, the embodiments relate to a storage device and an operating method thereof.

2. Description of Related Art

A storage device stores data under the control of a host device such as a computer or a smart phone. The storage device may include a memory device for storing data and a memory controller for controlling the memory device. The memory device may be a volatile memory device or a nonvolatile memory device.

In a volatile memory device, data is stored only when power is supplied. That is, stored data is lost when the supply of power is interrupted. The volatile memory device may include a Static Random Access Memory (SRAM), a Dynamic Random Access Memory (DRAM), and the like.

In a nonvolatile memory device, data is retained even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments provide a storage device having improved security and an operating method thereof.

According to an aspect of the present disclosure, there is to provided a storage device including a memory controller configured to control a memory device including a plurality of memory blocks, the storage device comprising: a host interface configured to receive an analog connection request signal provided by a host; and a host access controller configured to control access by the host according to host information acquired from the connection request signal.

According to another aspect of the present disclosure, there is provided a memory controller comprising: a host interface configured to receive an analog connection request signal provided by a host; and a host access controller configured to control access by the host according to host information acquired from the connection request signal, wherein the connection request signal includes a set waveform repeated a certain number of times with a distance between adjacent waveforms, wherein the host information includes at least one of information on amplitude of the waveform, on total length of the waveform, and on the distance between adjacent waveforms, and wherein the waveform is included in the connection request signal.

According to still another aspect of the present disclosure, there is provided a method for operating a storage device including a memory device including a plurality of memory blocks and a memory controller configured to control the memory device, the method comprising: loading system information stored in the memory device in a booting operation of the storage device; receiving an analog connection request signal provided by a host and an Out of Band (OOB) signal; providing, to the host, a signal in response to the OOB signal; and controlling access by the host according to host information acquired from the connection request signal.

According to still another aspect of the present disclosure, there is provided a data processing system comprising: a host configured to transmit an Out of Band (OOB) access request signal including information identifying the host, the information identifying the host being contained in a waveform of the OOB access request signal; and a storage device configured to selectively allow access thereto by the host through an OOB access response signal by comparing the information identifying the host in the OOB access request signal with stored identification information.

BRIEF DESCRIPTION OF THE DRAWINGS

Various embodiments will now be described more fully with reference to the accompanying drawings; however, elements and features of the present invention may be configured or arranged differently than disclosed herein. Thus, the present invention is not limited to the embodiments set forth herein. Rather, these embodiments are provided so that this disclosure is thorough and complete and fully conveys the scope of the embodiments to those skilled in the art.

In the drawings, dimensions of the figures may be exaggerated for clarity of illustration. It will be understood that when an element is referred to as being "between" two elements, it can be the only element between the two elements, or one or more intervening elements may also be present. Like reference numerals refer to like elements throughout. Also, throughout the specification, reference to "an embodiment," "another embodiment" or the like is not necessarily to only one embodiment, and different references to any such phrase are not necessarily to the same embodiment(s).

FIG. 5 is a diagram illustrating host information of FIG. 3 according to an embodiment of the present disclosure.

FIG. 6 is a diagram illustrating host information of FIG. 3 according to another embodiment of the present disclosure.

DETAILED DESCRIPTION

Figure 1:
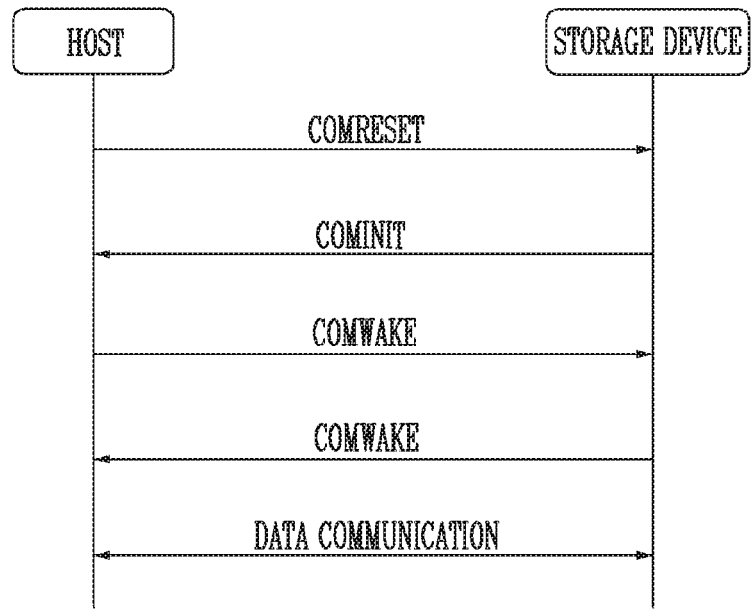
FIG. 1 is a diagram illustrating an initial connection operation between a host and a storage device according to an embodiment of the present disclosure.

The specific structural or functional description disclosed herein is for the purpose of describing embodiments according to the concept of the present disclosure. The present invention, however, may be implemented in other ways, which may be modifications or variations of any of the disclosed embodiments. Thus, the present invention is not limited to the embodiments set forth herein.

The present embodiments are described and illustrated in detail. However, the embodiments are not limited to specific details. Rather, the present invention is intended to include all changes, equivalents, or substitutes that do not depart from the spirit and technical scope of the present disclosure.

While terms such as "first" and "second" may be used to identify various components, such components are not limited by any of the above terms. The above terms are used only to distinguish one component from another that otherwise have the same or similar names. For example, a first component in one instance may be referred to as a second component in another instance without departing from the scope of rights of the present disclosure.

It will be understood that when an element is referred to as being "connected" or "coupled" to another element, it can be directly connected or coupled to the other element or one or more intervening elements may also be present. In contrast, when an element is referred to as being "directly connected" or "directly coupled" to another element, no intervening elements are present. Other expressions describing relationships between components such as "~ between," "immediately ~between" or "adjacent to ~" and "directly adjacent to ~" may be construed similarly. Communication between two elements, whether directly or indirectly connected/coupled, may be wired or wireless, unless the context indicates otherwise.

The terms used in the present application are merely used to describe particular embodiments, and are not intended to limit the present disclosure. Singular forms in the present disclosure are intended to include the plural forms and vice versa, unless the context clearly indicates otherwise. It will be further understood that terms such as "including" or "having," and the like are intended to indicate the existence of the features, numbers, operations, actions, components, parts, or combinations thereof but are not intended to preclude the possibility that one or more other features, numbers, operations, actions, components, parts, or combinations thereof may exist or may be added.

So far as not being differently defined, all terms used herein including technical or scientific terminologies have meanings that are commonly understood by those skilled in the art to which the present disclosure pertains. The terms having the dictionary definitions should be understood such that they have meanings consistent with the context of the related technique. So far as not being clearly defined in this application, terms should not be understood in an ideally or excessively formal way.

In describing embodiments, description of techniques that are well known to the art to which the present disclosure pertains and are not directly related to the present disclosure is omitted. As a result, aspects and features of the present invention are more clearly presented.

Various embodiments of the present disclosure will be described in detail with reference to the accompanying drawings in order for those skilled in the art to be able to readily practice the present invention.

FIG. 1 is a diagram illustrating an initial connection operation between a host and a storage device.

Referring to FIG. 1, a host performs data communication with a storage device. The host may perform an initial connection operation for performing the data communication with the storage device. For example, the host may exchange signals with the storage device for connection therewith according to a hand-shaking scheme.

In an embodiment, a connection request signal from the host to the storage device may be an analog signal. The connection request signal may be an Out Of Band (OOB) signal for OOB communication. The connection request signal may be a signal having a set waveform repeated a certain number of times with a distance between adjacent waveforms. The host may broadcast a communication reset signal COMRESET to achieve connection between various devices including the storage device. The COMRESET signal may be an OOB signal for requesting a response from a connectable device at the periphery of the host. When the host does not receive any response to the COMRESET signal within a certain time, the host may re-broadcast the COMRESET signal to peripheral storage devices.

The storage device may provide a communication initiation signal COMINIT to the host in response to the received COMRESET signal. The COMINIT signal may be an OOB signal provided by the storage device as a response to the COMRESET signal. When the host receives the COMINIT signal as a response to the COMRESET signal within a certain time, the host may transmit a communication wakeup signal COMWAKE to the storage device. When the host receives the COMINIT signal from a particular storage device, the host may recognize that storage device with which the host performs data communication. When the storage device transmits the COMINIT signal and then receives a COMWAKE signal from the host within a certain time, the storage device may transmit a COMWAKE signal to the host as a response to the received COMWAKE signal. When the host receives the COMWAKE signal from the storage device, the host may recognize that the storage device has completed preparation for data communication, and perform the data communication with the storage device.

Figure 2:
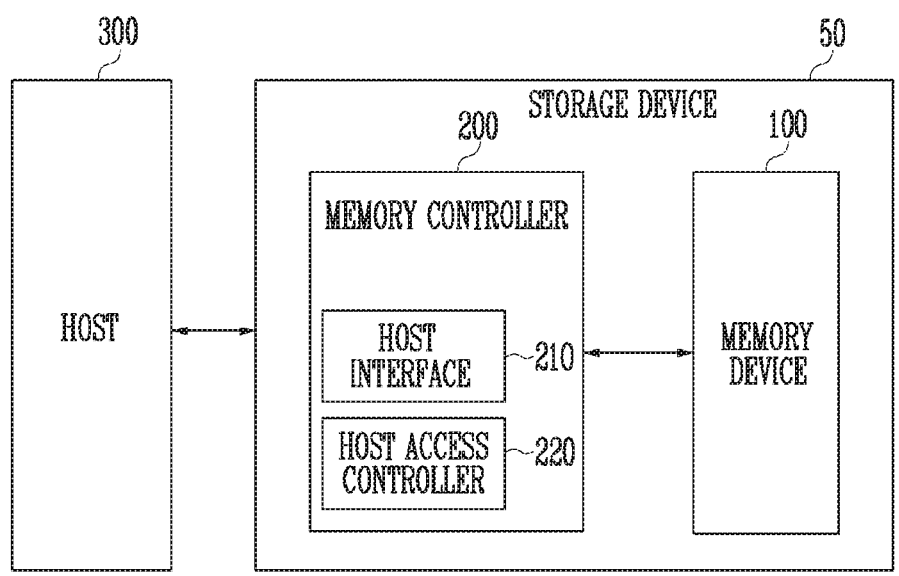
FIG. 2 is a diagram illustrating a structure of a storage device communicating with a host according to an embodiment of the present disclosure.

FIG. 2 is a diagram illustrating a structure of a storage device 50 communicating with a host 300.

Referring to FIG. 2, the storage device 50 may include a memory device 100 and a memory controller 200 for controlling an operation of the memory device 100. The storage device 50 may store data under the control of a host 300, such as a mobile phone, a smart phone, an MP3 player, a laptop computer, a desktop computer, a game console, a TV, a tablet PC or an in-vehicle infotainment.

The storage device 50 may be configured as any one of various types of storage devices according to a host interface that is a communication scheme with the host 300. For example, the storage device 50 may be implemented with any one of various types of storage devices such as a multi-media card of a Solid State Drive (SSD), a Multi-Media Card (MMC) such as an embedded Multi-Media Card (eMMC), a Reduced Size Multi-Media Card (RS-MMC), and a micro-Multi-Media Card (micro-MMC) type, a Secure Digital (SD) card of a Secure Digital (SD), a mini-Secure Digital (mini-SD) and a micro-Secure Digital (micro-SD) type, an Universal Serial Bus (USB) storage device, a Universal Flash Storage (UFS) device, a storage device of a Personal Computer Memory Card International Association (PCMCIA) card type, a storage device of a Peripheral Component Interconnection (PCI) card type, a storage device of a PCI-Express (PCI-E) card type, a Compact Flash (CF) card, a smart media card, and a memory stick.

The storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 operates under the control of the memory controller 200. The memory device 100 may include a memory cell array including a plurality of memory cells for storing data. The memory cell array may include a plurality of memory blocks. Each memory block may include a plurality of memory cells. One memory block may include a plurality of pages. In an embodiment, the page may be a unit for storing data or reading data stored in the memory device 100. The memory block may be a unit for erasing data. In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, by way of example, the memory device 100 is described as a NAND flash memory.

The memory device 100 receives a command and an address from the memory controller 200 and accesses an area selected by the address in the memory cell array. That is, the memory device 100 may perform an operation corresponding to the command on the area selected by the address. For example, the memory device 100 may perform a write (program) operation, a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

The memory controller 200 controls overall operations of the storage device 50. The memory controller 200 may include a host interface 210 for transmitting/receiving a communication signal to/from the host 300 and a host access controller 220 for controlling access of the host 300 to the storage device 50.

When power is applied to the storage device 50, the memory controller 200 may execute firmware (FW). When the memory device 100 is a flash memory device, the memory controller 200 may execute FW such as a Flash Translation Layer (FTL) for controlling communication between the host 300 and the memory device 100.

In an embodiment, the memory controller 200 may receive data and a Logical Block Address (LBA) from the host 300, and translate the LBA into a Physical Block Address (PBA) representing addresses of memory cells included in the memory device 100, in which data is to be stored.

The memory controller 200 may control the memory device 100 to perform a program operation, a read operation, an erase operation, or the like in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a program command, an address, and data without any request from the host 300, and transmit the program command, the address, and the data to the memory device 100. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. The memory controller 200 may control the memory devices according to an interleaving scheme so as to improve operational performance.

The host interface 210 may receive the connection request signal described with reference to FIG. 1 from the host 300 to connect with the storage device 50. The host interface 210 may provide the received connection request signal to the host access controller 220.

The host access controller 220 may control access of the host 300 to the storage device 50, based on host information acquired from the received connection request signal. The connection request signal may be an analog signal. The connection request signal may have a set waveform repeated a certain number of times with a distance between adjacent waveforms. The connection request signal may be an Out Of Band (00B) signal for OOB communication. The host information may include information on the amplitude of the waveform, information on the total length of the waveform, and information on the distance between adjacent waveforms.

In an embodiment, the host access controller 220 may load system information stored in the memory device 100 in a booting operation of the storage device 50. The system information may include host information of the host 300 that was previously connected to the storage device 50. Host information of a host first connected to the storage device 50 may be first host information. The host access controller 220 may control access of the host 300 according to whether host information of the host 300 trying to communicate with the storage device 50 corresponds to the first host information. When the host information of the host 300 corresponds to the first host information, the host access controller 220 may allow the access of the host 300. When the host information of the host 300 does not correspond to the first host information, the host access controller 220 may refuse the access of the host 300.

The host 300 may communicate with the storage device 50 using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a universal flash storage (UFS), a Secure Digital (SD), a Multi-Media Card (MMC) such as an embedded MMC (eMMC), a Dual In-line Memory Module (DIMM), a Registered DIMM (RDIMM), and a Load Reduced DIMM (LRDIMM).

Figure 3:
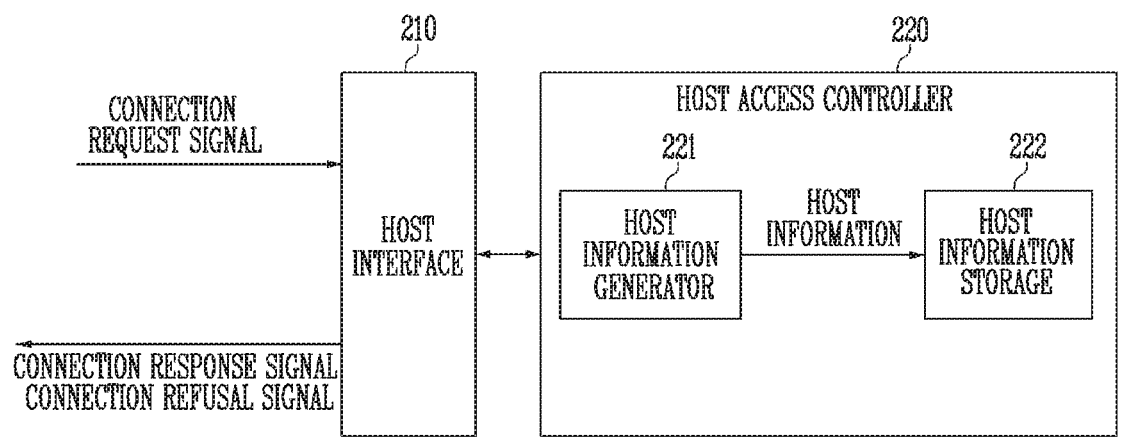
FIG. 3 is a diagram illustrating a structure of a memory controller of FIG. 2 according to an embodiment of the present disclosure.

FIG. 3 is a diagram illustrating a structure of the memory controller 200 of FIG. 2.

Referring to FIG. 3, the memory controller 200 may include the host interface 210 and the host access controller 220.

The host interface 210 may receive a connection request signal from the host 300. The connection request signal may be an analog signal. The connection request signal may be a signal having a set waveform repeated a certain number of times with a distance between adjacent waveforms. The connection request signal may be an Out Of Band (OOB) signal for OOB communication. The host interface 210 may provide the received connection request signal to the host access controller 220. The host access controller 220 may control access of the host 300 to the storage device 50 based on host information acquired from the received connection request signal.

When the host access controller 220 allows the access of the host 300, the host interface 210 may provide a connection response signal to the host 300. When the host 300 receives the connection response signal, the host 300 may initiate data communication with the storage device 50. When the host access controller 220 refuses the access of the host 300, the host interface 210 may provide a connection refusal signal to the host 300. When the host 300 receives the connection refusal signal, the host 300 cannot initiate the data communication with the storage device 50.

The host access controller 220 may include a host information generator 221 and a host information storage 222. The host access controller 220 may control the access of the host 300 according to host information acquired from the connection request signal provided by the host interface 210. The host access controller 220 may read the system information stored in the memory device 100 in the booting operation of the storage device 50, which is described with reference to FIG. 2. The system information may include host information. The host information storage 222 may store the host information included in the system information read by the host access controller 220.

The host information generator 221 may generate host information, based on the connection request signal provided by the host interface 210. The connection request signal may be a signal having a set waveform repeated a certain number of times with a distance between adjacent waveforms. The generated host information may include information on the amplitude of the waveform, information on the total length of the waveform, and information on the distance between adjacent waveforms.

The host information generator 221 may provide the generated host information to the host information storage 222.

The host information storage 222 may store the host information provided from the host information generator 221 to a nonvolatile memory included in the memory controller 200. When the host information storage 222 stores the host information, the host information storage 222 may also store the host information in the memory device 100 described with reference to FIG. 2. The memory device 100 may be a nonvolatile memory device. When the host information included in the system information stored in the memory device 100 does not exist, the host information storage 222 may store first host information. The first host information is host information of a host first connected to the storage device.

In an embodiment, when the first host information stored in the host information storage 222 does not exist, the host access controller 220 may allow the access of the host 300. When the first host information stored in the host information storage 222 exists, the host access controller 220 may determine whether host information of the host 300 currently trying to communicate with the storage device 50 corresponds to the first host information. When the host information of the host 300 currently trying to communicate with the storage device 50 corresponds to the first host information, the host access controller 220 may allow the access of the host 300. When the host access controller 220 allows the access of the host 300, the host interface 210 may provide a connection response signal to the host 300. When the host information of the host 300 currently trying to communicate with the storage device 50 does not correspond to the first host information, the host access controller 220 may refuse the access of the host 300. When the host access controller 220 refuses the access of the host 300, the host interface 210 may provide a connection refusal signal to the host 300. When the host information of the host 300 currently trying to communicate with the storage device 50 does not correspond to the first host information, the host access controller 220 may request the host 300 to input a password or manufacturer unique command. When the host 300 inputs the requested password or manufacturer unique command, the host access controller 220 may allow the access of the host 300.

Figure 4:
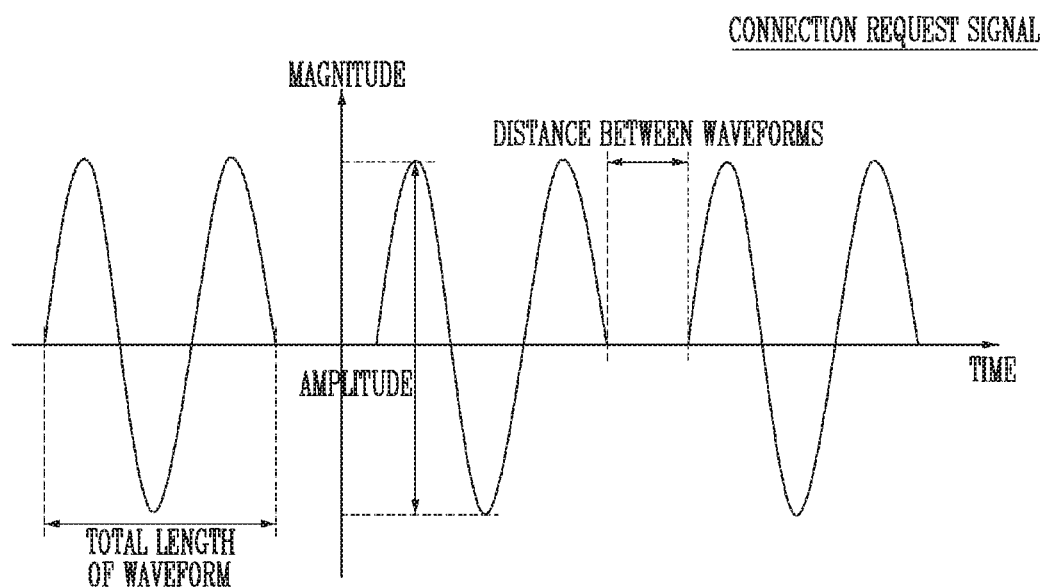
FIG. 4 is a diagram illustrating a connection request signal provided by the host of FIG. 2 according to an embodiment of the present disclosure.

FIG. 4 is a diagram illustrating the connection request signal provided by the host of FIG. 2.

Referring to FIG. 4, the horizontal axis represents time, and the vertical axis represents magnitude of an electrical signal.

In FIG. 4, the connection request signal may be an analog signal. The connection request signal may be a signal having a set waveform repeated a certain number of times with a distance between adjacent waveforms.

The amplitude of a waveform, the total length of the waveform and the distance between the waveforms have values within set ranges to perform communication between devices. The storage device 50 may identify the host 300 described with reference to FIG. 2 according to the amplitude of the waveform, the total length of the waveform and the distance between the waveforms. The connection request signal may an Out Of Band (OOB) signal used in OOB communication. The connection request signal may be any one of the COMRESET signal, the COMINIT signal, and the COMWAKE signal, described with reference to FIG. 1, in the OOB signal. The amplitude of the waveform may be any one of a minimum value, an average value, and a maximum value of the amplitude of the repeated waveforms in the connection request signal. The total length of the waveform may be any one of a minimum value, an average value, and a maximum value of the total length of a single one of the repeated waveforms included in the connection request signal. The distance between the waveforms may be any one of a minimum value, an average value, and a maximum value of distances between the repeated waveforms included in the connection request signal.

The connection request signal may be determined as any one of the COMRESET signal, the COMINIT signal, and the COMWAKE signal according to any one of the amplitude of the waveform, the total length of the waveform, and the distance between the waveforms.

FIG. 5 is a diagram illustrating an embodiment of the host information of FIG. 3.

Referring to FIGS. 4 and 5, the host information may include amplitude information. The amplitude information may be information on the amplitude of the waveform acquired from the connection request signal provided from the host 300. In an embodiment, the amplitude information may be values corresponding to respective sections of the connection request signal. The amplitude x of the waveform may be any one of a minimum value, an average value, and a maximum value of the amplitudes of the repeated waveforms included in the connection request signal.

The information on the amplitude of the waveform is determined according to a section to which the amplitude of the waveform belongs. For instance, the amplitude of the waveform has a value within a set range to perform communication between devices. The minimum value of the set range of the amplitude of the waveform may be $X\_0$, and the maximum value of the set range of the amplitude of the waveform may be $X\_n$ (n is a positive integer of 1 or more).

When the amplitude x of the waveform is larger than or equal to $X\_0$ and is smaller than $X\_1$, amplitude information corresponding to the amplitude x of the waveform may be $X\_D1$. When the amplitude x of the waveform is larger than or equal to $X\_1$ and is smaller than $X\_2$, amplitude information corresponding to the amplitude x of the waveform may be $X\_D2$. In this manner, when the amplitude x of the waveform is larger than or equal to $X\_(n-1)$ and is smaller than $X\_n$, amplitude information corresponding to the amplitude x of the waveform may be $X\_Dn$.

FIG. 6 is a diagram illustrating another embodiment of the host information of FIG. 3.

Referring to FIGS. 4 and 6, the host information may include total length information. The total length information may be information on the total length of the waveform acquired from the connection request signal provided by the host 300. In an embodiment, the total length information may be values corresponding to respective sections of the total length of the waveform included in the connection request signal. The total length y of the waveform may be any one of a minimum value, an average value, and a maximum value of the total lengths of the repeated waveforms included in the connection request signal.

The information on the total length of the waveform is determined according to a section to which the total length of the waveform belongs. For instance, the total length of the waveform has a value within a set range to perform communication between devices. When the minimum value of the set range of the total length of the waveform may be $Y\_0$, and the maximum value of the set range of the total length of the waveform may be $Y\_m$ (m is a positive integer of 1 or more).

When the total length y of the waveform is larger than or equal to $Y\_0$ and is smaller than $Y\_1$, total length information corresponding to the total length y of the waveform may be $Y\_D1$. When the total length y of the waveform is larger than or equal to $Y\_1$ and is smaller than $Y\_2$, total length information corresponding to the total lengthy of the waveform may be $Y\_D2$. In this manner, when the total length y of the waveform is larger than or equal to $Y\_(m-1)$ and is smaller than $Y\_m$, total length information corresponding to the total length y of the waveform may be $Y\_Dm$.

Figures 7, 8:
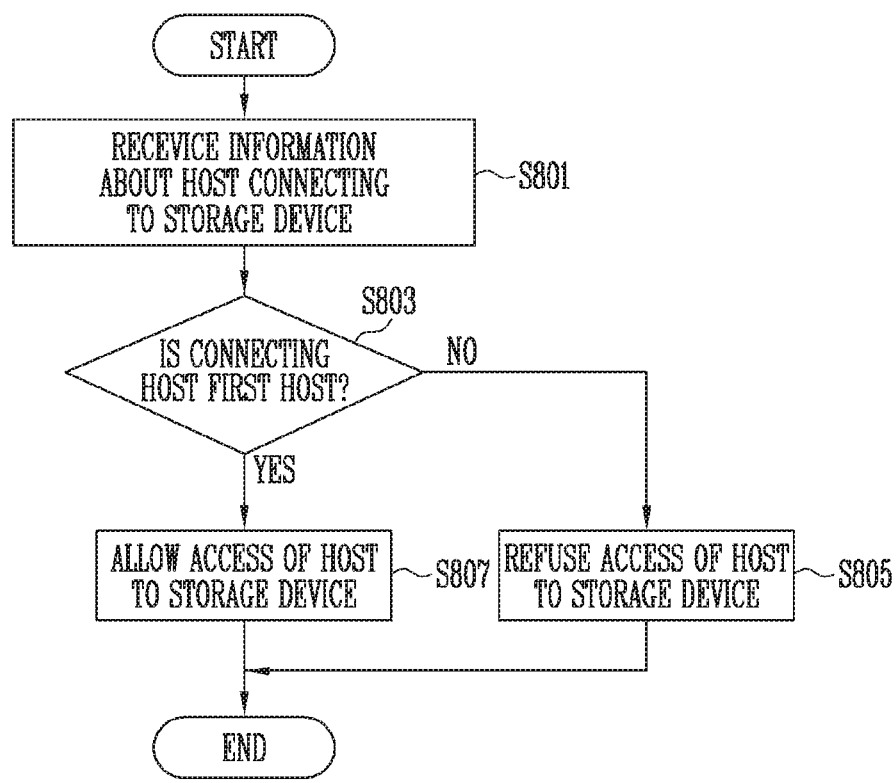
FIG. 7 is a diagram illustrating host information of FIG. 3 according to still another embodiment of the present disclosure.
FIG. 8 is a flowchart illustrating an operating method of the storage device according to an embodiment of the present disclosure.

FIG. 7 is a diagram illustrating another embodiment of the host information of FIG. 3.

Referring to FIGS. 4 and 7, the host information may include distance information. The distance information may be information on the distance between adjacent waveforms acquired from the connection request signal provided by the host 300. In an embodiment, the distance information may be values corresponding to respective sections, each including a distance between two adjacent waveforms, of the connection request signal. The distance z between the waveforms may be any one of a minimum value, an average value, and a maximum value of distances between adjacent waveforms included in the connection request signal.

The information on the distance between adjacent waveforms is determined according to a section to which the distance between adjacent waveforms belongs. For instance, the distance between the waveforms has a value within a set range to perform communication between devices. The minimum value of the set range of the distance between the waveforms may be $Z\_0$, and the maximum value of the set range of the distance between the waveforms may be $Z\_k$ (k is a positive integer of 1 or more).

When the distance z between the waveforms is larger than or equal to $Z\_0$ and is smaller than $Z\_1$, distance information corresponding to the distance z between the waveforms may be $Z\_D1$. When the distance z between the waveforms is larger than or equal to $Z\_1$ and is smaller than $Z\_2$, distance information corresponding to the distance z between the waveforms may be $Z\_D2$. In this manner, when the distance z between the waveforms is larger than or equal to $Z\_(k-1)$ and is smaller than $Z\_k$, distance information corresponding to the distance z between the waveforms may be $Z\_Dk$.

FIG. 8 is a flowchart illustrating an operating method of the storage device according to an embodiment of the present disclosure.

Referring to FIG. 8, in step S801, the storage device receives information about host connecting to the storage device.

In step S803, the storage device may determine whether the host connecting to the storage device is first host. The first host is a host first connected to the storage device. When the host is determined to be the first host (that is, "YES" at step S803), the storage device proceeds to the step S807, and otherwise, when the host is determined not to be the first host (that is, "NO" at step S803), the storage device proceeds to the step S805.

In step S805, the storage device may refuse the access of the host.

In step S807, the storage device may allow access of the host.

Figure 9:
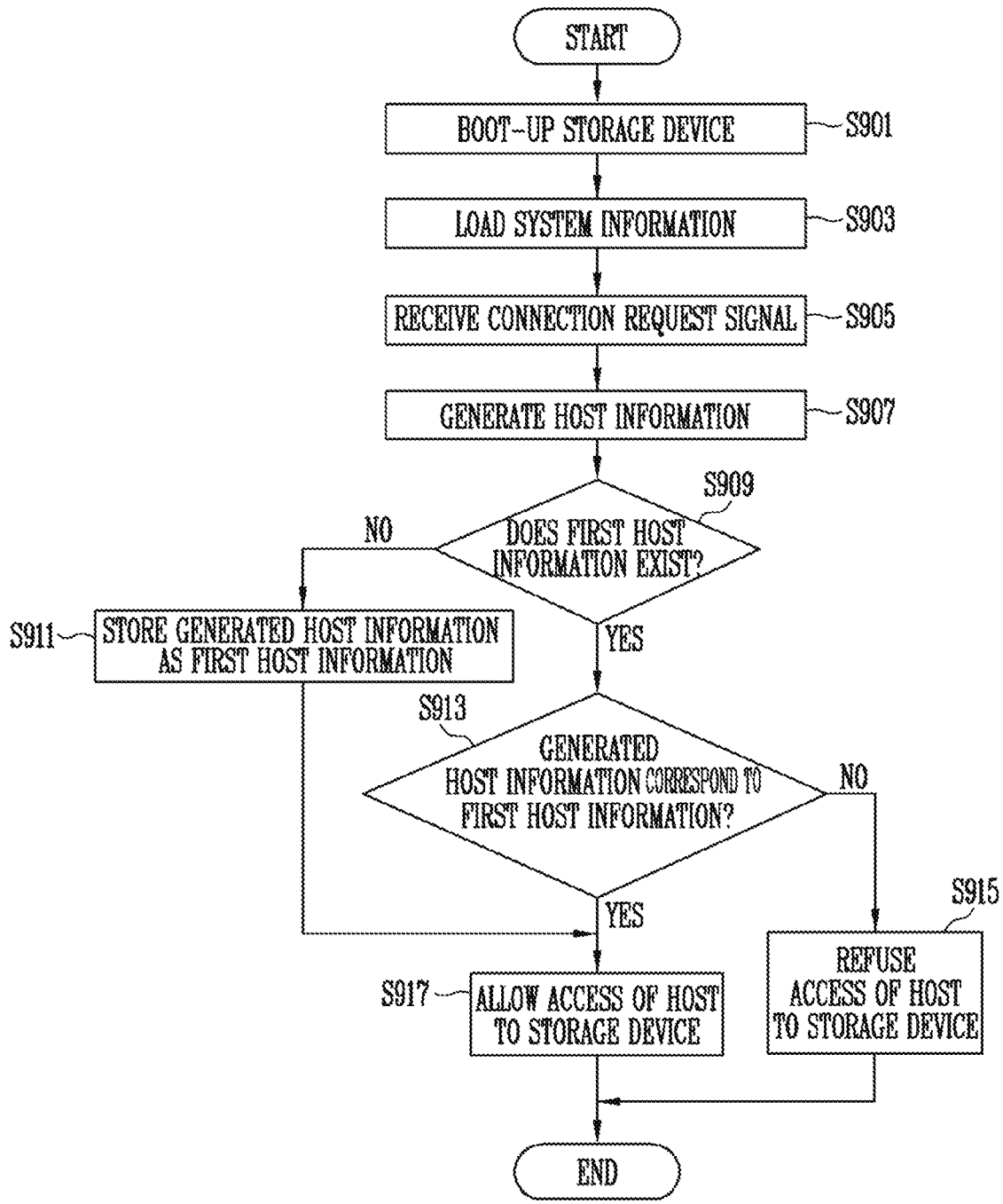
FIG. 9 is a flowchart illustrating an operation of the storage device according to an embodiment of the present disclosure.

FIG. 9 is a flowchart illustrating an operation of the storage device according to an embodiment of the present disclosure.

Referring to FIG. 9, in step S901, the storage device performs a booting operation.

In step S903, the storage device may load system information stored in the memory device included therein. The system information may include host information of the host that was previously connected to the storage device. The loaded host information may be stored and used in a nonvolatile memory device.

In step S905, the storage device may receive a connection request signal from the host trying to connect therewith.

In step S907, the storage device may generate host information, based on the received connection request signal. The connection request signal may be an analog signal. The connection request signal may be a signal having a set waveform repeated a certain number of times with a distance between adjacent waveforms. The connection request signal may be an Out Of Band (OOB) signal for OOB communication.

The host information may include amplitude information of the waveform. The host information may include total length information of the waveform. The host information may include distance information between the repeated waveforms.

In step S909, the storage device may determine whether first host information exists in the system information. The first host information is host information of a host first connected to the storage device. When the first host information is determined to exist (that is, "YES" at step S909), the storage device proceeds to the step S913, and otherwise, when the first host information is determined not to exist (that is, "NO" at step S909), the storage device proceeds to the step S911.

In step S911, the storage device may store the host information generated in the step S907 as the first host information. The first host information may be stored in each of a volatile memory device and a nonvolatile memory device.

In the step S913, the storage device may determine whether the generated host information corresponds to the first host information. When the generated host information is determined to correspond to the first host information as the determination result (that is, "YES" at step S913), the storage device proceeds to the step S917, and otherwise, when the generated host information is determined not to correspond to the first host information as the determination result (that is, "NO" at step S913), proceeds to step S915.

In the step S915, the storage device may refuse the access of the host. However, the storage device may additionally request the host to input a preset password or manufacturer unique command. When the host inputs the requested password or manufacturer unique command, the storage device may allow the access of the host.

In the step S917, the storage device may allow access of the host.

Figure 10:
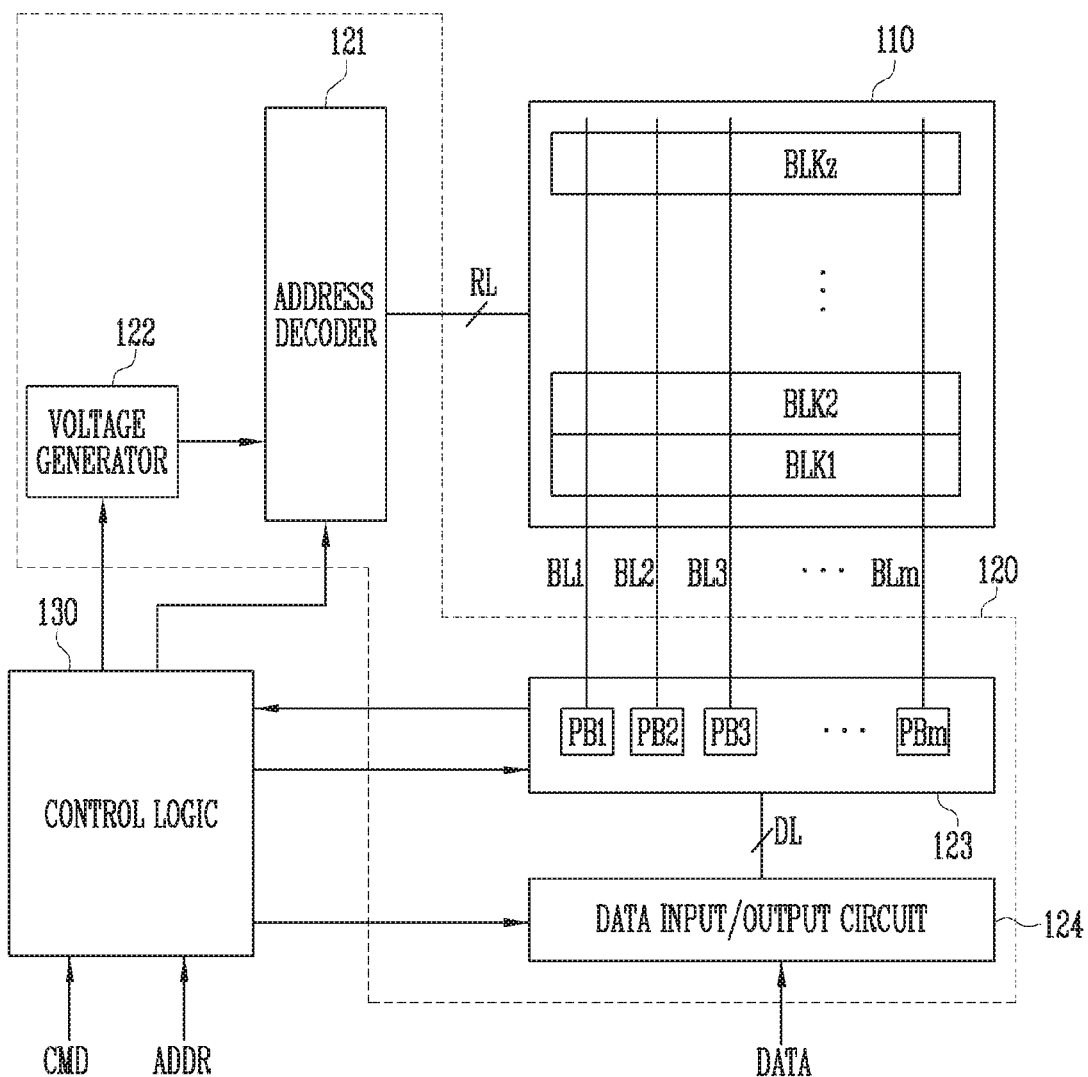
FIG. 10 is a diagram illustrating a memory device, e.g., that of FIG. 2.

FIG. 10 is a diagram illustrating in detail the memory device 100 of FIG. 2.

Referring to FIG. 10, the memory device 100 may include a memory cell array 110, a peripheral circuit 120, and control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a read/write circuit 123 through bit lines BL1 to BLm. Each of the plurality of memory blocks BLK1 to BLKz includes a plurality of memory cells.

Each memory block may include a plurality of memory cells for storing data. In an embodiment, the plurality of memory cells may be nonvolatile memory cells. Among the plurality of memory cells, memory cells connected to the same word line may be defined as one page. That is, the memory cell array 110 may include a plurality of pages. In an embodiment, each of the plurality of memory blocks BLK1 to BLKz included in the memory cell array 110 may include a plurality of dummy cells. One or more dummy cells may be connected in series between a drain select transistor and memory cells. Also, one or more dummy cells may be connected in series between a source select transistor and the memory cells.

Each of the memory cells of the memory device 100 may be configured as a single level cell (SLC) for storing one data bit, a multi-level cell (MLC) for storing two data bits, a triple level cell (TLC) for storing three data bits, or a quad level cell (QLC) for storing four data bits.

The peripheral circuit 120 may include the address decoder 121, a voltage generator 122, the read/write circuit 123, and a data input/output circuit 124.

The peripheral circuit 120 drives the memory cell array 110. For example, the peripheral circuit 120 may driver the memory cell array 110 to perform a program operation, a read operation, and an erase operation.

The address decoder 121 is connected to the memory cell array 110 through the row lines RL. The row lines RL may include drain select lines, word lines, source select lines, and a common source line. In an embodiment, the word lines may include normal word lines and dummy word lines. In an embodiment, the row lines RL may further include a pipe select line.

The address decoder 121 may operate under the control of the control logic 130. The address decoder 121 receives an address ADDR from the control logic 130.

The address decoder 121 may decode a block address in the received address ADDR. The address decoder 121 selects at least one memory block among the memory blocks BLK1 to BLKz according to the decoded block address. The address decoder 121 may decode a row address in the received address ADDR. The address decoder 121 may select at least one word line WL among the word lines connected to the selected memory block by applying voltages provided from the voltage generator 122 to the word line WL according to the decoded row address.

In a program operation, the address decoder 121 may apply a program voltage to the selected word line, and apply a program pass voltage having a level lower than that of the program voltage to unselected word lines. In a program verify operation, the address decoder 121 may apply a verify voltage to the selected word line, and apply a verify pass voltage higher than the verify voltage to the unselected word lines. In a read operation, the address decoder 121 may apply a read voltage to the selected word line, and apply a read pass voltage higher than the read voltage to the unselected word lines.

In an embodiment, an erase operation of the memory device 100 is performed in units of memory blocks. In an erase operation, the address ADDR input to the memory device 100 includes a block address. The address decoder 121 may decode the block address and select one memory block among the memory blocks BLK1 to BLKz according to the decoded block address. In the erase operation, the address decoder 121 may apply a ground voltage to word lines connected to the selected memory block.

In an embodiment, the address decoder 121 may decode a column address in the address ADDR transmitted thereto. The decoded column address (DCA) may be transmitted to the read/write circuit 123. As an example, the address decoder 121 may include components such as a row decoder, a column decoder, and an address buffer.

The voltage generator 122 may generate a plurality of voltages by using an external power voltage supplied to the memory device 100. The voltage generator 122 operates under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages by using the external power voltage or the internal power voltage. The voltage generator 122 may be configured to generate various voltages required by the memory device 100. For example, the voltage generator 122 may generate a plurality of program voltages, a plurality of pass voltages, a plurality of select read voltages, and a plurality of unselect read voltages.

For example, the voltage generator 122 may include a plurality of pumping capacitors for receiving the internal power voltage, and generate a plurality of voltages by selectively activating the plurality of pumping capacitors under the control of the control logic 130. The plurality of generated voltages may be supplied to the memory cell array 110 by the address decoder 121.

The read/write circuit 123 includes first to mth page buffers PB1 to PBm (m is a positive integer). The first to mth page buffers PB1 to PBm are connected to the memory cell array 110 respectively through first to mth bit lines BL1 to BLm. The first to mth page buffers PB1 to PBm operate under the control of the control logic 130.

The first to mth page buffers PB1 to PBm communicate data with the data input/output circuit 124. In a program operation, the first to mth page buffers PB1 to PBm receive data DATA to be stored through the data input/output circuit 124 and data lines DL.

In the program operation, a program pulse may be applied to a selected word line according to a row address. The first to mth page buffers PB1 to PBm may transfer data DATA received through the data input/output circuit 124 to memory cells of the selected word line through the bit lines BL1 to BLm. At least one memory cell among the memory cells of the selected word line may be programmed according to the transferred data DATA. A threshold voltage of a memory cell connected to a bit line to which a program allow voltage (e.g., a ground voltage) is applied may be increased. A threshold voltage of a memory cell connected to a bit line to which a program inhibit voltage (e.g., a power voltage) is applied may be maintained.

In a program verify operation, the first to mth page buffers PB1 to PBm read page data from the memory cells of the selected word line through the bit lines BL1 to BLm.

In a read operation, the read/write circuit 123 reads page data DATA from the memory cells of the selected word line through the bit lines BL, and outputs the read page data DATA to the data input/output circuit 124.

In an erase operation, the read/write circuit 123 may float the bit lines BL. In an embodiment, the read/write circuit 123 may include a column select circuit.

The data input/output circuit 124 is connected to the first to mth page buffers PB1 to PBm through the data lines DL. The data input/output circuit 124 operates under the control of the control logic 130.

The data input/output circuit 124 may include a plurality of input/output buffers (not shown) that receive input data. In a program operation, the data input/output circuit 124 may receive data DATA to be stored from an external controller (not shown). In a read operation, the data input/output circuit 124 outputs, to the external controller, data transmitted from the first to mth page buffers PB1 to PBm included in the read/write circuit 123.

The control logic 130 may be connected to the address decoder 121, the voltage generator 122, the read/write circuit 123, and the data input/output circuit 124. The control logic 130 may be configured to control overall operations of the memory device 100. The control logic 130 may operate in response to a command CMD transmitted from an external device.

Figure 11:
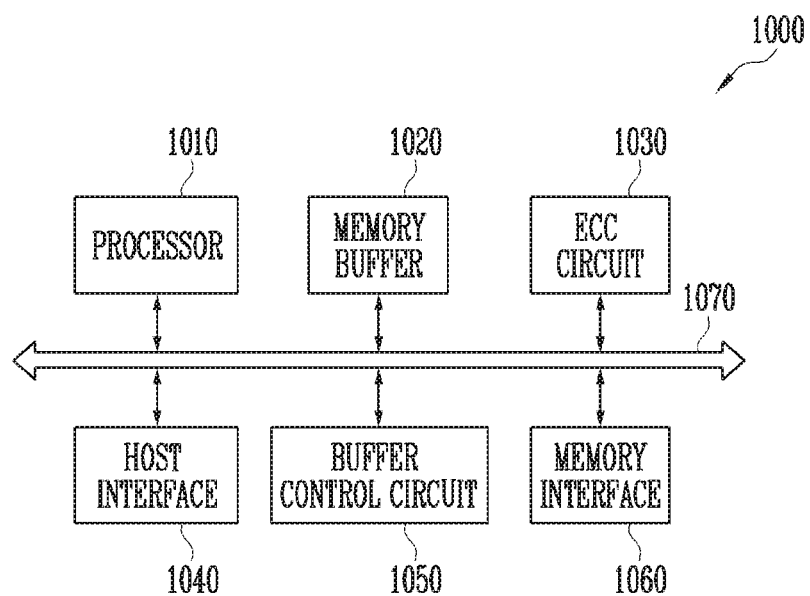
FIG. 11 is a diagram illustrating another embodiment of the memory controller of FIG. 2.

FIG. 11 is a diagram illustrating another embodiment of the memory controller of FIG. 2.

Referring to FIG. 11, a memory controller 1000 is connected to a host and a memory device, such as those shown in FIG. 2. The memory controller 1000 is configured to access the memory device in response to a request received from the host. For example, the memory controller 1000 is configured to control read, program, erase, and background operations of the memory device. The memory controller 1000 is configured to provide an interface between the memory device and the host. The memory controller 1000 is configured to drive firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the host through the host interface 1040, and communicate with the memory device through the memory interface 1060. Also, the processor 1010 may communicate with the memory buffer 1020 through the buffer control circuit 1050. The processor 1010 may control an operation of the storage device including the memory device, using the memory buffer 1020 as a working memory, a cache memory or a buffer memory.

The processor 1010 may perform a function of a flash translation layer (FTL). The processor 1010 may translate a logical block address (LBA) provided by the host through the FTL into a physical block address (PBA). The FTL may receive an LBA, using a mapping table, to be translated into a PBA. Several address mapping methods of the FTL exist according to mapping units, for example, a page mapping method, a block mapping method, and a hybrid mapping method. Any of these mapping methods may be used.

The processor 1010 is configured to randomize data received from the host. For example, the processor 1010 may randomize data received from the host, using a randomizing seed. The randomized data is provided as data to be stored to the memory device to be programmed in the memory cell array.

In a read operation, the processor 1010 is configured to derandomize data received from the memory device. For example, the processor 1010 may derandomize data received from the memory device, using a derandomizing seed. The derandomized data may be output to the host.

In an embodiment, the processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded to data may be transferred to the memory device through the memory interface 1060.

The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a universal flash storage (UFS), a Secure Digital (SD), a Multi-Media Card (MMC) such as an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 may not include the memory buffer 1020 and the buffer control circuit 1050. One or both of the memory buffer 1020 and the buffer control circuit 1050 may be provided separately or its/their functions distributed within the memory controller 1000.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other so as not interfere with, or influence, each other. The data bus may be connected to the host interface 1040, the buffer control circuit 1050, the ECC circuit 1030, and the memory interface 1060. The control bus may be connected to the host interface 1040, the processor 1010, the buffer control circuit 1050, the memory buffer 1020, and the memory interface 1060.

Figure 12:
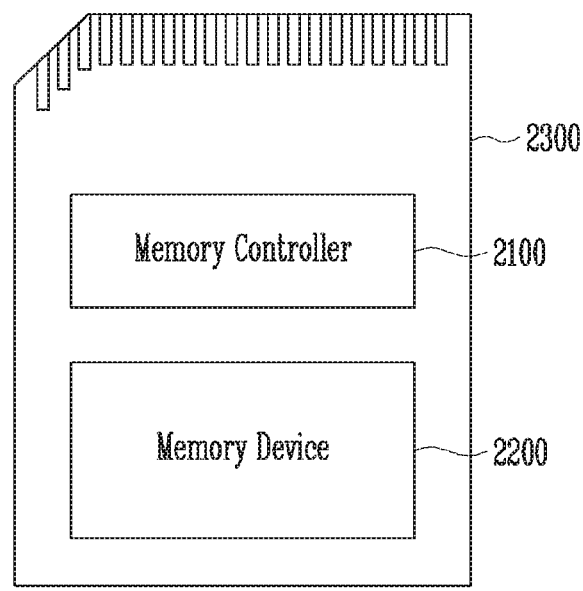
FIG. 12 is a block diagram illustrating a memory card system to which the storage device is applied according to an embodiment of the present disclosure.

FIG. 12 is a block diagram illustrating a memory card system to which the storage device is applied according to an embodiment of the present disclosure.

Referring to FIG. 12, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to driver firmware for controlling the memory device 2200. The memory controller 2100 may be implemented identically to the memory controller 200 described with reference to FIG. 2.

In an example, the memory controller 2100 may include components such as a Random Access Memory (RAM), a processor, a host interface, a memory interface, and an ECC circuit.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols such as a Universal Serial Bus (USB), Multi-Media Card (MMC) such as an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

In an example, the memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device to constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and/or a Universal Flash Storage (UFS).

Figure 13:
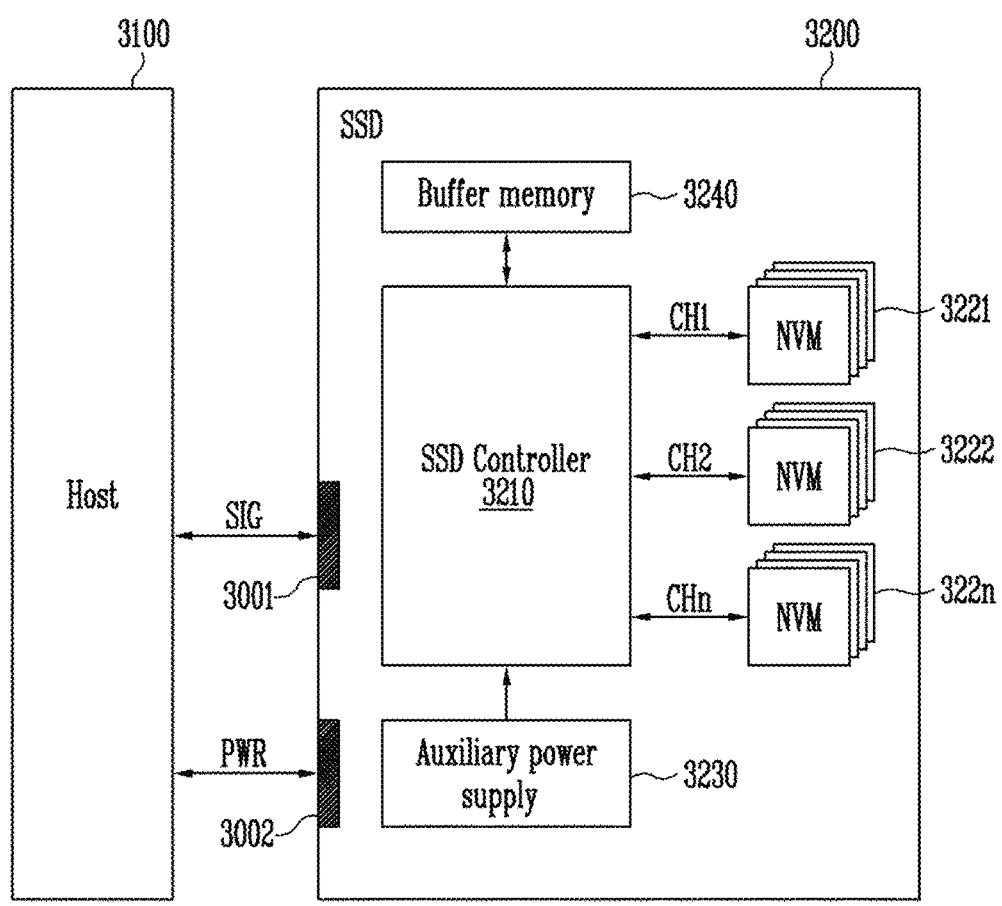
FIG. 13 is a block diagram illustrating a Solid State Drive (SSD) to which the storage device is applied according to an embodiment of the present disclosure.

FIG. 13 is a block diagram illustrating a Solid State Drive (SSD) to which the storage device is applied according to an embodiment of the present disclosure.

Referring to FIG. 13, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322*n*, an auxiliary power supply 3230, and a buffer memory 3240.

In an embodiment, the SSD controller 3210 may serve as the memory controller 200 described with reference to FIG. 2.

The SSD controller 3210 may control the plurality of flash memories 3221 to 322*n* in response to a signal SIG received from the host 3100. In an example, the signal SIG may be based on an interface between the host 3100 and the SSD 3200. For example, the signal SIG may be defined by at least one of interfaces such as a Universal Serial Bus (USB), Multi-Media Card (MMC) such as an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is connected to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be disposed externally to the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 14:
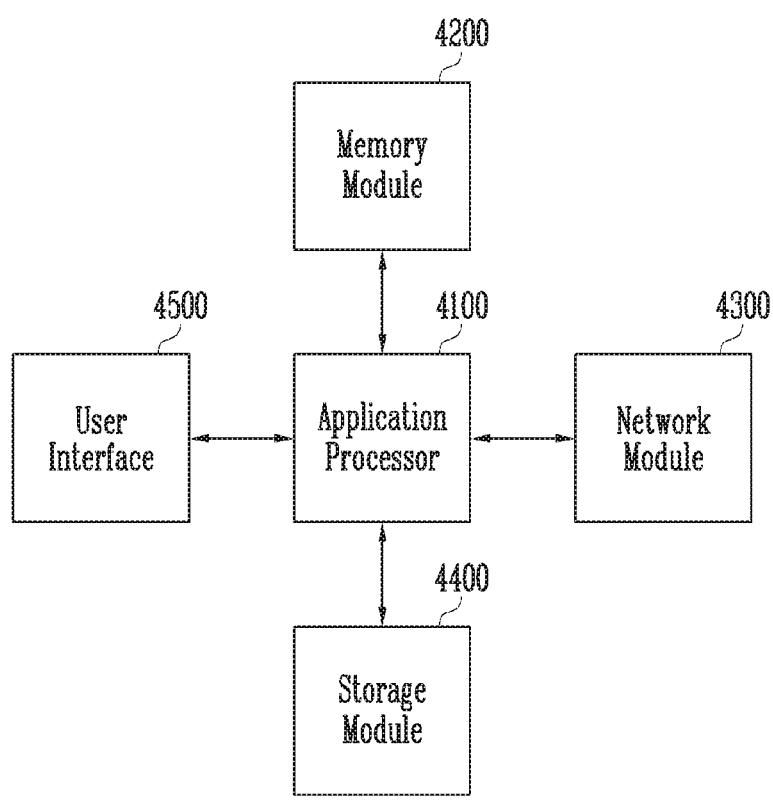
FIG. 14 is a block diagram illustrating a user system to which the storage device is applied according to an embodiment of the present disclosure.

FIG. 14 is a block diagram illustrating a user system to which the storage device is applied according to an embodiment of the present disclosure.

Referring to FIG. 14, the user system 4000 includes an application processor 4100, a memory module 4200, a network module 4300, a storage module 4400, and a user interface 4500.

The application processor 4100 may drive components included in the user system 4000, such as an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, and the plurality of nonvolatile memory devices may operate identically to the memory device described with reference to FIG. 2. The storage module 4400 may operate identically to the storage device 50 described with reference to FIG. 2.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

According to embodiments of the present disclosure, a storage device having improved security and an operating method thereof are provided.

While the present disclosure has been illustrated and described with reference to embodiments thereof, it will be understood by those skilled in the art in light of the present disclosure that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The disclosed embodiments disclosed only examples to facilitate an understanding of, but not limit, the present invention. That is, it should be apparent to those skilled in the art that various modifications can be made on the basis of the technological scope of the present disclosure.

Although specific terminologies are used here, they are used to explain, not limit, the embodiments of the present disclosure. Many variations and modifications are possible within the spirit and scope of the present disclosure, as those skilled in the art will recognize from of the technological scope of the present disclosure in addition to the embodiments disclosed herein.

What is claimed is:

1. A storage device including a memory controller configured to control a memory device including a plurality of memory blocks, the storage device comprising:
    a host interface configured to receive an analog connection request signal provided by a host; and
    a host access controller configured to acquire host information from the analog connection request signal and to allow the host to access the storage device based on the host information,
    wherein the analog connection request signal includes a set waveform repeated a certain number of times with a distance between adjacent waveforms, amplitude of the waveform being varied over time, and
    wherein the host information includes information on the amplitude of the waveform, information on total length of the waveform, and information on the distance between adjacent waveforms.

2. The storage device of claim 1, wherein the analog connection request signal is an Out of Band (OOB) signal used in OOB communication.

3. The storage device of claim 1,
wherein the host access controller stores the host information in any one memory block among the plurality of memory blocks, and
wherein the memory device is a nonvolatile memory device.

4. The storage device of claim 1, wherein the host access controller includes:
a host information generator configured to generate the host information based on the analog connection request signal; and
a host information storage configured to store the host information.

5. The storage device of claim 4,
wherein the host information generator generates first host information that is host information about a host first connected to the storage device, and
wherein the host information storage stores the first host information.

6. The storage device of claim 5, wherein, when the first host information is present in the host information storage, the host access controller controls the access by the host according to whether the host information corresponds to the first host information.

7. The storage device of claim 6, wherein, when the host information corresponds to the first host information, the host access controller provides a connection response signal to allow the host to access the storage device.

8. The storage device of claim 6, wherein, when the host information does not correspond to from the first host information, the host access controller provides a connection refusal signal for refusing access by the host to the storage device.

9. A memory controller comprising:
a host interface configured to receive an analog connection request signal provided by a host; and
a host access controller configured to acquire host information from the analog connection request signal and to allow the host to access the storage device based on the host information,
wherein the analog connection request signal includes a set waveform repeated a certain number of times with a distance between adjacent waveforms,
wherein amplitude of the waveform is varied over time,
wherein the host information includes information on the amplitude of the waveform, on total length of the waveform, and on the distance between adjacent waveforms, and
wherein the waveform is included in the analog connection request signal.

10. The memory controller of claim 9, wherein the analog connection request signal is an Out of Band (OOB) signal used in OOB communication.

11. The memory controller of claim 9, wherein the host access controller includes:
a host information generator configured to generate the host information based on the analog connection request signal; and
a host information storage configured to store the host information.

12. The memory controller of claim 11,
wherein the host information generator generates first host information that is host information about a host first connected to the storage device, and
wherein the host information storage stores the first host information.

13. The memory controller of claim 12, wherein, when the first host information is present in the host information storage, the host access controller controls the access by the host according to whether the host information corresponds to the first host information.

14. A method for operating a storage device including a memory device including a plurality of memory blocks and a memory controller configured to control the memory device, the method comprising:
loading system information stored in the memory device in a booting operation of the storage device;
receiving an analog connection request signal provided by a host and an Out of Band (OOB) signal;
providing, to the host, a signal in response to the OOB signal; and
acquiring host information from the analog connection request signal and to allow the host to access the storage device based on the host information,
wherein the analog connection request signal includes a set waveform repeated a certain number of times with a distance between adjacent waveforms, amplitude of the waveform being varied over time, and
wherein the host information includes information on the amplitude of the waveform, information on total length of the waveform, and information on the distance between adjacent waveforms.

15. The method of claim 14, further comprising:
storing first host information that is host information about a host first connected to the storage device in any one memory block among the plurality of memory blocks;
wherein the memory device is a nonvolatile memory device.

16. The method of claim 15, wherein, in the controlling of the access by the host, when the first host information is present in the system information, the access by the host is controlled according to whether the host information corresponds to the first host information.

17. The method of claim 15, wherein, the controlling of the access by the host includes, when the host information does not correspond to from the first host information, refusing the access by the host.

* * * * *